(12) United States Patent
Haruta et al.

(10) Patent No.: US 9,944,012 B2
(45) Date of Patent: Apr. 17, 2018

(54) HEAT-SHRINKABLE POLYESTER FILM AND PACKAGE (71) Applicant: TOYOBO CO., LTD., Osaka-shi, Osaka (JP)

(72) Inventors: Masayuki Haruta, Tsuruga (JP); Norimi Tabota, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 15/559,738

(22) PCT Filed: Mar. 23, 2016

(86) PCT No.: PCT/JP2016/059096
§ 371 (c)(1),
(2) Date: Sep. 19, 2017

(87) PCT Pub. No.: WO2016/152885
PCT Pub. Date: Sep. 29, 2016

(65) Prior Publication Data
US 2018/0043607 A1 Feb. 15, 2018

(30) Foreign Application Priority Data
Mar. 25, 2015 (JP) ................................. 2015-063114

(51) Int. Cl.
B29C 55/08 (2006.01)
B29C 61/06 (2006.01)
(Continued)

(52) U.S. Cl.
CPC .......... *B29C 55/08* (2013.01); *B29C 47/0004* (2013.01); *B29C 47/0021* (2013.01);
(Continued)

(58) Field of Classification Search
CPC ..... B29C 55/08; B29C 61/06; B29C 47/0004; B29C 47/0057; B29C 47/8845;
(Continued)

(56) References Cited

FOREIGN PATENT DOCUMENTS

| JP | S55-034937 A | 3/1980 |
| JP | S62-183328 A | 8/1987 |

(Continued)

OTHER PUBLICATIONS

Japanese Patent Office, International Search Report in International Patent Application No. PCT/JP2016/059096 (dated Jun. 14, 2016).

*Primary Examiner* — Michael C Miggins
(74) *Attorney, Agent, or Firm* — Leydig, Voit & Mayer, Ltd.

(57) ABSTRACT

The invention provides a heat-shrinkable polyester film in which the differences in physical properties in the width direction are reduced even if the film has a small thickness. The heat-shrinkable polyester film has a main shrinkage direction in a width direction of the film and has (1) a thickness of 6-27 μm; (2) a maximum value of the molecular orientation angle of 5 degrees or less; (3) a hot-water shrinkage at 90° C. in the width direction of the film 40-85%; (4) a difference between a maximum value and a minimum value of the hot-water shrinkage at 90° C. in the width direction of the film of 2% or less; and (5) a difference between a maximum value and a minimum value of the maximum shrinkage stress at 90° C. in the width direction of the film of less than 0.3 MPa.

8 Claims, 1 Drawing Sheet (51) Int. Cl.
| | |
|---|---|
| *B29C 47/00* | (2006.01) |
| *B29C 47/88* | (2006.01) |
| *B32B 7/12* | (2006.01) |
| *B32B 27/08* | (2006.01) |
| *B32B 27/30* | (2006.01) |
| *B32B 37/15* | (2006.01) |
| *B32B 27/36* | (2006.01) |
| *B65C 3/26* | (2006.01) |
| *B65D 23/08* | (2006.01) |
| *C08J 5/18* | (2006.01) |
| *B29C 63/00* | (2006.01) |
| *B29L 31/00* | (2006.01) |
| *B29K 67/00* | (2006.01) |

(52) U.S. Cl.
CPC ...... *B29C 47/0057* (2013.01); *B29C 47/0066* (2013.01); *B29C 47/8845* (2013.01); *B29C 61/06* (2013.01); *B29C 63/0065* (2013.01); *B32B 7/12* (2013.01); *B32B 27/08* (2013.01); *B32B 27/302* (2013.01); *B32B 27/36* (2013.01); *B32B 37/153* (2013.01); *B65C 3/26* (2013.01); *B65D 23/0878* (2013.01); *C08J 5/18* (2013.01); *B29K 2067/00* (2013.01); *B29L 2031/744* (2013.01); *B32B 2519/00* (2013.01); *C08J 2367/00* (2013.01); *C08J 2467/00* (2013.01)

(58) Field of Classification Search
CPC ............ B29C 47/0021; B29C 47/0066; B29C 63/0065; C08J 2467/00; C08J 5/18; C08J 2367/00; B32B 7/12; B32B 27/08; B32B 27/302; B32B 37/153; B32B 27/36; B32B 2519/00; B65C 23/0878; B65D 23/0878; B29L 2031/744; B29K 2067/00
See application file for complete search history.

(56) References Cited

FOREIGN PATENT DOCUMENTS

| | | |
|---|---|---|
| JP | H04-059332 A | 2/1992 |
| JP | H06-262676 A | 9/1994 |
| JP | H10-249933 A | 9/1998 |
| JP | 2002-018948 A | 1/2002 |
| JP | 2002-301762 A | 10/2002 |
| JP | 2004-034451 A | 2/2004 |
| JP | 2006-045317 A | 2/2006 |
| JP | 2008-274160 A | 11/2008 |
| JP | 2009-143043 A | 7/2009 |
| JP | 2009-163233 A | 7/2009 |

HEAT-SHRINKABLE POLYESTER FILM AND PACKAGE

CROSS-REFERENCE TO RELATED APPLICATIONS

This patent application is the U.S. national phase of International Patent Application No. PCT/JP2016/059096, filed Mar. 23, 2016, which claims the benefit of Japanese Patent Application No. 2015-063114, filed on Mar. 25, 2015, which are incorporated by reference in their entireties herein.

TECHNICAL FIELD

The present invention relates to a heat-shrinkable polyester film which is suitable for a label application and a package using the label.

BACKGROUND ART

Recently, in applications such as label package doubling as a protection of a glass bottle and a plastic bottle etc, and display of articles, cap sealing and accumulation package, there have been, widely used as a shrink label, a polyester-based heat-shrink able film which is high in heat resistance, easy to incinerate, and excellent in solvent resistance. The use amount of the polyester-based heat-shrinkable film tends to increase being accompanied by an increase in volume of PET (polyethylene terephthalate) bottle containers etc.

Heretofore, a heat-shrinkable film with a thickness of 40 to 60 μm has been used as a label for covering a PET bottle. However, heat-shrinkable films used for packaging become mere garbage after using the contents. Given this situation, in response to the growing environmental awareness of reducing garbage as much as possible, film manufacturers are also attempting to reduce the thickness of a heat-shrinkable polyester film.

However, when the thickness of the heat-shrinkable polyester film is reduced, the temperature of the film is rapidly raised even inside of the film by heating, and hence the heat shrinkage of the film also rapidly begins. At this time, if there is a variation in thickness or molecular orientation in the width direction of the film, a significant variation in heat shrinkage properties occurs. As a result, an appearance defect, of the film after shrinkage may occur, leading to a defective product.

Conventionally, a film drawn in the width direction in a transverse drawing apparatus is known to have a different orientation state of molecules between the central part and the end parts of the film (bowing phenomenon). Patent Document 1 discloses a technique in which the bowing phenomenon is suppressed in a biaxially drawn film, which is not a heat-shrinkable film, by changing a film temperature in the width direction of the film when drawing in the width direction. Patent Document 2 also discloses a technique in which heating is performed such that a temperature distribution in the width direction becomes constant to obtain a transversely drawn film having no irregularity in thickness in the width direction.

PRIOR ART DOCUMENT

Patent Documents

Patent Document 1: Japanese Examined Patent Application Publication No. 2002-301782

Patent Document 2: Japanese Examined Patent Application Publication No. Hei10-249933

SUMMARY OF THE INVENTION

Problems to be Solved by the Invention

The above-mentioned conventional techniques are not related to a heat-shrinkable film. In the heat-shrinkable film, a variation in the orientation state of molecules conspicuously appears as a variation in heat shrinkage behavior, and hence a higher level control of the molecular orientation is required as compared with the conventional techniques.

Furthermore, as described above, heat-shrinkable films having a reduced thickness are used more frequently in recent years. Since the production speed of a film having a reduced thickness is faster than that of a film having a large thickness, the drawing speed (deformation speed) at the time of drawing of the film becomes fast. For this reason, there is a problem in that a variation in the orientation state of molecules conspicuously appears more easily at the time of drawing.

Under such circumstances, an object of the present invention is to provide a heat-shrinkable polyester film in which the differences in physical properties in the width direct ion are reduced even if the film has a small thickness.

Means for Solving the Problem

The present invention to solve the above problems is a heat shrinkage polyester film which has a main shrinkage direction in a width direction of the film and satisfies following requirements (1) to (5):

(1) the film has a thickness of 6 μm or more and 27 μm or less;

(2) when a width of 800 mm in the film of 800 mm or more in width is divided into eight to obtain samples, and a molecular orientation angle of the film is determined for each of the samples, a maximum value of the molecular orientation angle is 5 degrees or less;

(3) when a width of 800 mm in the film of 800 mm or more in width is divided into eight to obtain samples, a hot-water shrinkage at 90° C. in the width direction of the film determined for each of the samples is 40% or more and 85% or less;

(4) when a width of 800 mm in the film of 800 mm or more in width is divided into eight to obtain samples, a hot-water shrinkage at 90° C. in the width direction of the film is determined for each of the samples, a difference between a maximum value and a minimum value of the hot-water shrinkage at 90° C. in the width direction of the film is 2% or less; and (5) when a width of 800 mm in the film of 800 mm or more in width is divided into four to obtain samples, and a maximum shrinkage stress at 90° C. in the width direction of the film is determined for each of the samples, a difference between a maximum value and a minimum value of the maximum shrinkage stress at 90° C. in the width direction of the film is less than 0.3 MPa.

Further, it is preferable that when an absorbency ratio is measured at 17 spots with a pitch of 50 mm in the width direction of 800 mm in the film of 800 mm or more in width, a difference between a maximum value and a minimum value of an absorbency ratio of an absorbency at 1340 cm$^{-1}$ to an absorbency at 1410 cm$^{-1}$ (1340 cm$^{-1}$/1410 cm$^{-1}$) determined for the 17 spots by polarized ATR method is 0.05 or less.

Further, it is preferable that The heat-shrinkable polyester film according to claim 1 or 2, wherein when a thickness is measured across a width of 800 mm in the film of 800 mm or more in width, and an average value of the thickness is taken as Tave, a maximum value of the thickness is taken as Tmax, and a minimum value of the thickness is taken as Tmin, an irregularity of thickness in the width direction expressed by a following equation is 1% or more and 13% or less:

Irregularity of thickness (%)={(Tmax−Tmin)/Tave}× 100

The present invention also contains a package formed by covering at least a part of an outer periphery of an object to be packaged with a label obtained from the heat-shrinkable polyester film according to any of claims 1 to 3 and then shrinking the label on the covered object by heat.

Effects of the Invention

Since the heat-shrinkable polyester film of the present invention has reduced differences in physical properties in the width direction while having a small thickness, a variation in heat shrinkage behavior in the width direction can be also reduced.

MODE FOR CARRYING OUT THE INVENTION

The polyester used in the present invention is a polyester whose main constituent is ethylene terephthalate unit. Namely, it contains preferably 50 mol % or more, more preferably 60 mol % or more, and further preferably 70 mol % or more of ethylene terephthalate unit with the total constituting units of the polyester being 100 mol %.

Other dicarboxylic acid components constituente the polyester of the present invention can include aromatic dicarboxylic acids such as isophthalic acid, ortho-phthalic acid, and 2,6-naphthalenedicarboxylic acid; aliphatic dicarboxylic acids such as adipic acid, azelaic acid, sebacic acid and decanedicarboxylic acid; and alicyclic dicarboxylic acid such as 1,4-cyclohexanedicarboxylic acid.

Further, it is preferable not to contain polybasic carboxylic acids of tribasic or more (for example, trimellitic acid, pyromellitic acid and anhydride thereof etc.) in the polyester. A heat-shrinkable polyester film obtained by using a polyester containing these polybasic carboxylic acids is hard to achieve a necessary high shrinkage.

Diol components constitute the polyester include aliphatic diols such as ethylene glycol, 1,3-propanediol, 2,2-diethyl-1,3-propanediol, 2,2-n-butyl-2-ethyl-1,3-propanediol, 2,2-isopropyl-1,3-propanediol, 2,2-di-n-butyl-1,3-propanediol, 1,4-butanediol, hexanediol, neopentyl glycol and hexanediol; alicyclic diols such as 1,4-cyclohexanedimethanol; and aromatic diols such as bisphenol A.

Of these, cyclic diols such as 1,4-cyclohexanedimethanol and diols having 3 to 6 carbon atoms (for example, 1,3-propanediol, 1,4-butanediol, neopentyl glycol hexanediol, etc.) are preferably used. In particular, when 1,4-butanediol or neopentyl glycol is used, a polyester which satisfies the requirements for the present invention can be easily obtained.

Further, the polyester has 17 mol % or more of the sum of an amorphous component in 100 mol % of the polyhydric alcohol component and in 100 mol % of the polybasic carboxylic acid component (that is, in 200 mol % of the total) in the whole polyester resin, preferably 18 mol % or more, more preferably 19 mol % or more, and particularly preferably 20 mol % or more. The upper limit of the total of amorphous components is not particularly limited, but 30 mol % or less is preferable. When the amount of amorphous components is set within the above-mentioned range, a polyester having a glass transition point (Tg) being adjusted to 60 to 80° C. is obtained.

In the polyester, it is preferable not to contain diols having 8 or more carbon atoms (for example, octanediol etc.) or polyhydric alcohols of trihydric or more (for example, trimethylolpropane, trimethylolethane, glycerin, diglycerin etc.). A heat-shrinkable polyester film obtained by using a polyester containing these diols or these polyhydric alcohols is hard to achieve a necessary high shrinkage. Furthermore, in the polyester, it is also preferable not to contain diethylene glycohol, triethylene glycol, or polyethylene glycol.

To a resin for forming the heat-shrinkable polyester film of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber.

By adding fine particles as lubricant to a resin for forming the heat-shrinkable polyester film of the present invention, it is preferable to make workability (slipperiness) of the film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 μm (when measured by coulter counter), and it can be suitably selected according to need.

As a method for compounding the above-described particles in a resin for forming the heat-shrinkable polyester film, for example, they can be added in an arbitrary step in production of the polyester resin, but they are preferably added in a step of esterification, or in a step after completion of ester exchange reaction and before start of polycondensation reaction as slurry dispersed in ethylene glycol etc., followed by carrying out polycondensation reaction. Further, it is also preferably earned out by a method in which slurry of particles dispersed in ethylene glycol, water or the like and raw materials of polyester resin are mixed using a kneading extruder with a vent, or a method in which dried particles and raw materials of polyester resin are mixed using a kneading extruder.

It is also possible to conduct corona treatment, coating treatment, frame treatment etc. on the heat-shrinkable polyester film of the present invention in order to enhance adhesiveness of film surface.

The heat-shrinkable polyester film of the present invention may also include a layered polyester film having at least one polyester resin layer. When two or more polyester resin layers are laminated, the respective polyester resin layers may be polyesters having the same composition or different compositions. Another layer that may be laminated is not particularly limited as long as it is a thermoplastic resin layer, but it is preferably a polystyrene resin layer in view of prices and heat shrinkage properties.

It is preferable to add a thermoplastic resin and/or a rubber component to the polystyrene resin. As examples of the thermoplastic resin, styrene resins such as polystyrene having an atactic structure, AS resin, and ABS resin; polyester resins such as polyethylene terephthalate, polyethylene naphthalate, and polybutylene terephthalate; polyamide resins such as nylon 6, nylon 66, nylon 12, nylon 4, and polyhexamethylene adipamide; polyolefin resins such as polyethylene, polypropylene and polybutene, and the like can be given.

As the rubber component, a rubbery copolymer containing a styrene compound as a constituent component is preferable, and a random, block or graft copolymer formed by copolymerization of one or more selected from styrenes and one or more selected from rubber components can be given. Examples of such rubbery copolymer include styrene-butadiene copolymer rubber, styrene-isoprene block copolymer, rubber obtained by hydrogenating part or all of their butadiene portions, methyl acrylate-butadiene-styrene copolymer rubber, acrylonitrile-butadiene-styrene copolymer rubber, acrylonitrile-alkyl acrylate-butadiene-styrene copolymer rubber, methyl methacrylate-alkyl acrylate-butadiene-styrene copolymer rubber, and the like. Since the above-mentioned rubbery copolymers containing a styrene compound as a constituent component have styrene units, they have good dispersibility in a polystyrene resin having a syndiotactic structure, and a large effect of improving plasticity of the polystyrene resin. As a compatibility adjusting agent, the above-mentioned rubbery copolymers containing a styrene compound as a constituent component can be suitably used.

As the rubber component, in addition, natural rubber, polybutadiene, polyisoprene, polyisobutylene, neoprene, ethylene-propylene copolymer rubber, urethane rubber, silicone rubber, acrylic rubber, polyether-ester rubber, polyester-ester rubber, and the like can be used.

The weight average molecular weight of the polystyrene resin is preferably 10,000 or more, and more preferably 50,000 or more. If the weight average molecular weight is less than 10,000, the strength and elongation properties and heat resistance of the film are unfavorably liable to deteriorate. The upper limit of the weight average molecular weight is not particularly limited, but if the weight average molecular weight exceeds 1,500,000, breakage or the like associated with increase in drawing tension may unfavorably occur.

Polystyrene resins of various grades are commercially available by various manufacturers, and a commercially available polystyrene resin may be used.

Next, the properties of the heat-shrinkable polyester film of the present invention will be described. The heat-shrinkable polyester film of the present invention has a thickness of 6 μm or more and 27 μm or less. The thickness of the heat-shrinkable polyester film of the present invention needs to be within this range since the present invention aims at reducing the thickness of a heat-shrinkable polyester film. The thickness of the heat-shrinkable polyester film is more preferably 6 μm or more and 25 μm or less, and further preferably 6 μm or more and 20 μm or less.

Furthermore, in the heat-shrinkable polyester film of the present invention, an irregularity of thickness in the width direction is preferably 13% or less. As for the irregularity of thickness, a film of 800 mm in width sampled from a film of 800 mm or more in width so that left and right margins are allowed to be even is used (hereinafter, the same applies in this specification). Samples of 800 mm in width and 40 mm in length are cut out of the film, and the thickness of each sample is measured at a speed of 5 m/min under a measurement pressure load of 0.15 gf using a device, "FILM SYNNEX", manufactured by Anritsu Corporation. When the average value of the thickness is taken as Tave, the maximum value of the thickness is taken as Tmax, and the minimum value of the thickness is taken as Tmin, the irregularity of thickness is expressed by the following equation.

Irregularity of thickness (%)={(Tmax−Tmin)/Tave}×100

If the irregularity of thickness exceeds 13%, heat shrinkage behavior in the width direction also unfavorably varies. Although a smaller irregularity of thickness is preferable, the lower limit thereof is 1% because it is difficult from the viewpoint of production to make it smaller than 1%.

With regard to the heat-shrinkable polyester film of the present invention, when a width of 800 mm in a film of 800 mm or more in width is divided into eight in the width direction to obtain samples, and a molecular orientation angle of the film is determined for each of the samples, the maximum value of the molecular orientation angle is 5 degrees or less. Each sample has a dimension of the longitudinal direction×the width direction=100 mm×100 mm. The molecular orientation angle will be explained below. First, in the present invention, the term "molecular orientation axis" refers to a direction in which the degree of molecular orientation is the largest when observed in an X-Y plane wherein an X axis is the longitudinal direction of the film, a Y axis is the width direction of the film, and a Z axis is the thickness direction of the film. The molecular orientation angle is defined as an angle between the axis of the longitudinal direction of the film or the axis of the width direction of the film and the observed molecular orientation axis. The method for measuring the molecular orientation angle is as follows. A film of 800 mm in width sampled from a film of 800 mm or more in width so that left and right margins are allowed to be even is divided into eight in the width direction to prepare rectangular samples having a dimension of the longitudinal direction×the width direction=100 mm×100 mm. The molecular orientation angle (angle of the molecular orientation axis direction) of each of the cut out film samples is measured with a molecular orientation angle measuring device (MOA-6004) manufactured by Oji Scientific Instruments. As for the molecular orientation angle, the angle of the longitudinal direction of the film is set to 0 degree, and when the angle of the molecular orientation axis direction is smaller than 45 degrees with respect to the longitudinal direction, the difference from 0 degree is measured, and when the angle of the molecular orientation axis direction is larger than 45 degrees with respect to the longitudinal direction, the difference from 90 degrees is measured.

With regard to the heat-shrinkable polyester film of the present invention, when a width of 800 mm in a film of 800 mm or more in width is divided into eight in the width direction, square samples of which one side along the width direction has a length of 10 cm and one side along a direction orthogonal to the width direction has a length of 10 cm are cut out of the film, the cut out samples are dipped in a no-load state in hot water of 90° C.±0.5° C. for 10 seconds and then immediately dipped in water of 25° C.±0.5° for 10 seconds, and thereafter, heat shrinkages (that is, hot-water shrinkage at 90° C.) in the film width direction (the main shrinkage direction) are calculated from the lengths before and after shrinkage according to the following Equation 1, the heat shrinkages of all samples are 40% or more and 85% or less.

$$\text{Hot-water shrinkage}=\{(\text{length before shrinkage}-\text{length after shrinkage})/\text{length before shrinkage}\}\times 100(\%)\quad \text{Equation 1}$$

When the hot-water shrinkage in the width direction at 90° C. is less than 40%, the demand for a high shrinkable film which covers a whole container (so-called full label) cannot be satisfied, and in addition, since the shrinkage amount is small, in the case of being used as a label, strains, insufficient shrinkage, wrinkles, slack and the like are generated on the label after heat shrinkage. The hot-water shrinkage at 90° C. is preferably 45% or more, and more preferably 50% or more. Since the degree of demand for the film having a hot-water shrinkage in the width direction at 90° C. exceeding 85% is low, the upper limit of the hot-water heat shrinkage is set to 85%.

Moreover, with regard to the heat-shrinkable polyester film of the present invention, the hot-water shrinkage at 90° C. in the longitudinal direction (a direction orthogonal to the main shrinkage direction) of the film when measured in the same manner as above is preferably—5% or more and 12% or less. It is not preferred that the hot-water shrinkage in the longitudinal direction at 90° C. be less than—5% since the film is excessively extended by heating, so that a satisfactory shrinkage appearance cannot be attained at the time of being used as a label for a bottle. Conversely, if the hot-water heat shrinkage in the longitudinal direction at 90° C. is more than 12%, the label after heat shrinkage is shortened (the height of the label reduces), and hence such a label is not preferred as a full label since the label area becomes smaller, and also not preferred since strains are easily generated on the label after heat shrinkage. The upper limit of the hot-water heat shrinkage in the longitudinal direction at 90° C. is preferably 10% or less, more preferably 8% or less, and further preferably 6% or less.

With regard to the heat-shrinkable polyester film of the present invention, it is also important that the difference between the maximum value and the minimum value among the hot-water shrinkages in the width direction at 90° C. of eight samples obtained by dividing a width of 800 mm of the film into eight in the width direction is 2% or less. When this difference exceeds 2%, the hot-water shrinkage in the width direction unfavorably varies.

With regard to the heat-shrinkable polyester film according to the present invention, as for samples obtained by dividing a width of 800 mm of the film into four in the width direction, when a maximum shrinkage stress in the width direction of the film is measured in hot air of 90° C., it is also important that the difference between the maximum value and the minimum value of the maximum shrinkage stress is less than 0.3 MPa. When this difference is 0.3 MPa or more, the heat shrinkage behavior in the width direction unfavorably varies. The maximum shrinkage stress in hot-air of 90° C. in the width direction of the film is preferably 2 MPa or more and 14 MPa or less. It is not preferred that the maximum shrinkage stress at 90° C. in the width direction of the film be less than 2 MPa because at the time of being used as a label for a bottle, the label may be slackened and may not be closely brought into contact with the bottle. The maximum shrinkage stress at 90° C. is more preferably 4 MPa or more, and further preferably 5 MPa or more. Conversely, it is not preferred that the maximum shrinkage stress at 90° C. exceed 14 MPa because strains are easily generated on the label after heat shrinkage. The maximum shrinkage stress at 90° C. is more preferably 13.5 MPa or less, and further preferably 13 MPa or less. The samples for measuring a maximum shrinkage stress have a length of 100 nm.

With regard to the heat-shrinkable polyester film of the present invention, when an absorbency ratio is measured with a pitch of 50 mm in the width direction of the film of 800 mm (measurement at 17 spots), it is preferred that the difference between the maximum value and the minimum value of an absorbency ratio of an absorbency at 1340 $cm^{-1}$ to an absorbency at 1410 $cm^{-1}$ (1340 $cm^{-1}$/1410 $cm^{-1}$) in the measurement at each of the 17 spots by polarized ATR method be 0.05 or less.

The absorbency ratio represents a trans conformation ratio of molecular orientation. It is considered that the trans conformation represents the state of entanglement of molecular chains, and when the trans conformation ratio is high, the degree of entanglement of molecular chains is also high. It is considered that ease of shrinkage varies with variations in structure of the molecular chain (the length of the rotational isomer) in the case where polyester prepared with amorphous monomers is used as a raw material. However, when the degree of entanglement of molecular chains easy to shrink is high, by applying sufficient heat to relax the entanglement, the entanglement of the molecular chains is relaxed and reduced (the change in molecular chains becomes large), and it is considered that the shrinkage is also increased. If the difference between the maximum value and the minimum value of the above absorbency ratio exceeds 0.05, the heat shrinkage behavior in the width direction unfavorably varies.

The absorbency ratio itself in the width direction in the measurement at each of the 17 spots is preferably 0.65 to 1.0. If the absorbency ratio in the width direction of the film is less than 0.65, the molecular orientation is high, so that the shrinkage at 90° C. unfavorably decreases. The absorbency ratio is more preferably 0.67 or more, and further preferably 0.69 or more. On the other hand, if the absorbency ratio in the width direction of the film exceeds 1.0, the molecular orientation becomes too high, the shrinkage speed increases (a label does not gently shrink), and wrinkles and distortion tend to occur on the label after shrinkage. The absorbency ratio in the width direction is more preferably 0.98 or less, and further preferably 0.96 or less.

Here, since the polarized ATR method is a method of analyzing the molecular orientation of a sample surface (about several μm in depth), it is preferred that in the case of the layered polyester film, the absorbency ratio in the outermost polyester layer be within the above numerical range. The measurement method of the absorbency ratio will be described later.

In a method for producing the heat-shrinkable polyester film of the present invention, the foregoing polyester raw material is melt-extruded by an extruder to form an undrawn film, and the undrawn film is transversely uniaxially drawn by a predetermined method shown below and heat-treated. In the case of laminating layers, a plurality of extruders, feed blocks, and multi-manifolds may be used. In this connection, polyester can be obtained by allowing the suitable dicarboxylic acid component and diol component mentioned above to undergo a polycondensation by a known method. Moreover, usually, two or more kinds of chip-like polyesters are mixed to be used as raw materials. In the case of laminating layers, a plurality of extruders may be used.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

The undrawn film thus obtained is preheated at 80 to 120° C., preferably at 90 to 110° C. as necessary, and then drawn in the transverse direction (a direction orthogonal to the extruding direction) by a tenter or the like by 3.0 times or more, preferably 3.5 times or more and 7 times or less. The drawing temperature is 65° C. or higher and 100° C. or lower, preferably 70° C. or higher and 95° C. or lower. Longitudinal drawing does not necessarily have to be performed before and after transverse drawing, but may be performed as necessary.

At the time of transverse drawing, it is preferable to heat both end parts (each 5% to 20% of the entire film width) of the film with infrared ceramic heaters such that the temperatures of the end parts become equal to or higher than the temperature at the middle part of the film, and more preferably become 1 to 4° C. higher than the temperature at the middle part of the film. When performing transverse drawing using a tenter, both ends of the film are grasped with clips, and the thickness of the end parts therefore becomes thicker than the middle part. As a result, the temperatures at the end parts of the film become lower than the temperature at the middle part at the time of drawing, and the drawing stress increases, whereby the so-called bowing phenomenon becomes large, and the differences in physical properties in the width direction of the film become large. In order to suppress this, it is preferable to adjust the output of the infrared ceramic heaters at the time of transverse drawing so that the film temperature at the end parts after drawing becomes equal to or higher than the temperature at the middle part. In addition, as the thickness of the entire film becomes thinner, it is necessary to increase a production speed to maintain the volume of production. As the production speed increases, a residence time in the tenter decreases and a temperature difference in the width direction generally increases. When the production speed increases, the deformation speed at the time of transverse drawing also increases, the drawing stress increases, leading to a larger bowing phenomenon, and the differences in physical properties in the width direction of the film become large. Therefore, it is preferable to reduce the drawing stress of the end parts.

After transverse drawing, heat treatment is preferably performed at a temperature 1° C. to 30° C. higher than a drawing temperature. The heat treatment is performed to relax a tension of the film after drawing, and a heat shrinkage is adjusted by a temperature at the time of the heat treatment, and it is also effective to reduce a natural shrinkage. However, as a disadvantage of the heat treatment, there is a problem that if the film after drawing is heated in a heat treatment zone, a bowing phenomenon occurs and the physical properties in the width direction are deteriorated (reference document: Seikei-kakou, 4(5), 312 (1992), published from The Japan Society of Polymer Processing).

Accordingly, the inventors made studies on suppression of the bowing phenomenon. As a result, the inventors have obtained two findings that (1) the bowing phenomenon in the heat treatment zone can be suppressed by heating the end parts of the film in a transverse drawing process, and the differences in physical properties in the width direction are reduced, and (2) in the bowing phenomenon occurring in a bowed shape, the film shrinks uniformly in the longitudinal direction across the entire width by heating the end parts of the film in a heat treatment process, whereby an angle of the bowed shape becomes gentle, the bowing phenomenon can be suppressed, and the differences in physical properties in the width direction are reduced.

Therefore, it is preferred that infrared ceramic heaters be installed in the heat treatment process in addition to the transverse drawing process described above. An area to be heated with the ceramic heaters is preferably about 5 to 20% of the entire width from each of the end parts of the film. In addition, heating is preferably performed with the infrared ceramic heaters such that with regard to a temperature in the width direction of the film after the heat treatment process, the temperature of the end parts becomes 1 to 4° C. higher than the temperature of the middle part. As a result, the heat-shrinkable polyester film of the present invention can be obtained.

The heat-shrinkable polyester film of the present invention can be formed into a label by a conventionally known method. As an example of the method, a heat-shrinkable polyester film cut to a desired width is subjected to an appropriate printing, and the left and right end parts of the film are stacked and bonded by solvent bonding or the like to produce a tube film. The tube film is cut to an appropriate length to obtain a tube-like label. As an organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

After providing perforations on the above label by a known method, a PET bottle is covered with the label, and the PET bottle with the label is put on a conveyor belt or the like and passed through a shrinkage tunnel (steam tunnel) for blowing steam or a shrinkage tunnel (hot air tunnel) for blowing hot air. At the time of passing through the tunnel, the label shrinks by heat, whereby the label is mounted to a bottle container such as a PET bottle.

The package of the present invention is a package in which a label provided with a perforation or a notch using the foregoing heat-shrinkable polyester film of the present invention is covered at least on a part of the outer periphery of an object to be packaged and then to shrink by heat. The object to be packaged can be exemplified by PET bottles for beverage, various kinds of bottles, cans, plastic containers for confectionery, a box lunch and the like, paper-made boxes, and the like. In general, in the case where a label using a heat-shrinkable polyester film is covered on the packaging object and heat-shrunk, the label is heat-shrunk by about 5 to 70% and closely attached on the package. Additionally, a label covered on a packaging object may be printed or may not be printed.

The present application claims the benefit of priority to Japanese Patent Application Number 2015-63114 filed on Mar. 25, 2015. The entire contents of the specifications of Japanese Patent Application Number 2015-63114 filed on Mar. 25, 2015 are hereby incorporated by reference.

EXAMPLES

Hereinafter, the present invention is described in more detail by Examples, but the present invention is by no means limited to aspects of the Examples, and it can be suitably modified in the range not departing from the scope of the present invention. Evaluation methods of films are as follows.

[Heat Shrinkage (Hot-Water Shrinkage)]

A width of 800 mm in a film of 800 mm or more in width was divided into eight in the width direction, square samples of which one side along the width direction has a length of 10 cm and one side along a direction orthogonal to the width direction has a length of 10 cm are cut out of the film, the cut out samples were dipped in a no-load state in hot water of 90° C.±0.5° C. for 10 seconds and then immediately dipped in water of 25° C.±0.5° C. for 10 seconds, and thereafter, heat shrinkages (that is, hot-water shrinkage at 90° C.) were calculated from the lengths before and after shrinkage according to the following Equation 1.

Hot-water shrinkage={(length before shrinkage−length after shrinkage)/length before shrinkage}×100(%)   Equation 1

[Shrinkage Stress]

A sample was obtained by dividing a width of 800 mm in the film of 800 mm or more in width into four in the width direction, and measured for the shrinkage stress using a strength and elongation measuring machine with a heating furnace (TENSILON (a registered trademark of ORIENTEC Co., LTD)) manufactured by ORIENTEC Co., LTD (formerly Toyo Baldwin Corporation). The heating furnace was previously heated to 90° C., and the distance between chucks was set to 100 mm. The air blast blown into the heating furnace was once stopped, the door of the heating furnace was opened, the sample was fitted to the chucks, after which the door of the heating furnace was quickly closed and the air blast was restarted. The shrinkage stress was measured over a period of not shorter than 30 seconds, and the maximum value obtained during the measurement was defined as the maximum shrinkage stress (MPa).

[Absorbency Ratio]

In a film of 800 mm or more in width, absorbency ratios were measured with a pitch of 50 mm in the width direction of 800 mm (measurement at 17 spots), and as for each sample (in the measurement at the 17 spots), an absorbency ratio of an absorbency at 1340 $cm^{-1}$ to an absorbency at 1410 $cm^{-1}$ (1340 $cm^{-1}$/1410 $cm^{-1}$) was measured by polarized ATR method. Specifically, using an FT-IR spectrometer ("FTS 60A/896" manufactured by Varian Inc.), the measurement was performed utilizing the absorption band of infrared absorption spectrum with polarized light under the conditions of a measurement wavenumber region of 650 to 4000 $cm^{-1}$ and a cumulative number of 128 times by ATR method.

[Molecular Orientation Angle]

In a film of 800 mm or more in width, a width of 800 mm was divided into eight in the width direction, and samples having a dimension of the longitudinal direction×the width direction=100 mm×100 mm were cut out. As for each of the cut out film samples, the molecular orientation angle (angle of the molecular orientation axis direction) was measured with a molecular orientation angle measuring device (MOA-6004) manufactured by Oji Scientific Instruments. As the molecular orientation angle, the angle of the longitudinal direction of the film was set to 0 degree, and when the angle of the molecular orientation axis direction was smaller than 45 degrees with respect to the longitudinal direction, the difference from 0 degree was measured, and when the angle of the molecular orientation axis direction was larger than 45 degrees with respect to the longitudinal direction, the difference from 90 degrees was measured.

[Thickness of Film and Irregularity in Thickness]

Samples of 800 mm in width and 40 mm in length were cut out of a film of 800 mm or more in width, and the thickness of each sample was measured at a speed of 5 m/min under a measurement pressure load of 0.15 gf using a device, "FILM SYNNEX", manufactured by Anritsu Corporation. The average value of the thickness was taken as Tave, the maximum value of the thickness was taken as Tmax, and the minimum value of the thickness was taken as Tmin, and the irregularity of thickness was calculated by the following equation.

Irregularity of thickness (%)={($T$max−$T$min)/$T$ave}×100

<Preparation of Polyester Raw Material>

100 mol % of dimethyl terephthalate (DMT) as a dibasic acid component, and 70 mol % of ethylene glycol (EG) and 30 mol % of neopentyl alcohol as glycol components were placed in a stainless steel autoclave equipped with a stirrer, a thermometer and a partially circulating cooler such that the amount of glycol components was 2.2 times the amount of dimethyl terephthalate in terms of the molar ratio, and an ester exchange reaction was carried out using 0.05 mol % (based on the acid component) of zinc acetate as an ester exchange catalyst while distilling away generated methanol to outside the system. Thereafter, 0.025 mol % (based on the acid component) of antimony trioxide was added as a polycondensation catalyst, and a polycondensation reaction was carried out at 280° C. under a reduced pressure of 26.6 Pa (0.2 torr) to obtain polyester (A) having an intrinsic viscosity of 0.70 dl/g. By a conventional method, the polyester was formed into a chip to obtain chip A. Chip B (polyethylene terephthalate) and chip C (polybutylene terephthalate) shown in Table 1 were synthesized by the similar process as described above. In the table, NPG is neopentyl glycol. The intrinsic viscosities of chips A, B and C were 0.72 dl/g, 0.70 dl/g and 1.15 dl/g, respectively.

Details of raw material chips used in Examples and Comparative Examples, and resin compositions and production conditions of films in Examples and Comparative Examples are shown in Tables 1 and 2, respectively. Note that films except for a film of Example 6 are a single-layer type film composed of a blend polymer, and the film of Example 6 is a three-kind five-layer type film of X/Y/Z/Y/X.

TABLE 1

| | Contents of raw material chips | |
|---|---|---|
| | Property | Manufacturer Product name |
| Chip A | NPG 30 mol % copolymerization polyethylene terephthalate | — |
| Chip B | polyethylene terephthalate | — |
| Chip C | polybutylene terephthalate | — |
| Chip D | styrene-butyl acrylate copolymer | Manufactured by PS Japan Corporation SC004 |
| Chip E | polystyrene | Manufactured by PS Japon Corporation HH203 |
| Chip F | styrene-butadiene block polymer | Manufactured by Denka Company Limited. Clearen 530L |
| Chip G | styrene-butadiene block polymer | Manufactured by Asahi Kasei Chemicals Corporation Tufprene 126 |

"Clearen" is a registered trademark of Denka Company Limited.
"Tufprene" is a registered trademark of Asahi Kasei Chemicals Corporation.

TABLE 2

| | layer structure | Thickness of each layer before drawing (first layer/second layer/third layer/fourth layer/fifth layer) (μm) | Resin composition of each layer (first layer/second layer/third layer/fourth layer/fifth layer) | Drawing conditions to transverse (width direction) | | | |
|---|---|---|---|---|---|---|---|
| | | | | Preheating process Preset temperature (° C.) | Drawing process Preset temperature (° C.) | drawing ratio | output of the infrared heaters |
| Example 1 | one-kind one-layer | 72 | A:B:C = 70:20:10 | 95 | 75 | 4 | 60% |
| Example 2 | one-kind one-layer | 72 | A:B:C = 70:20:10 | 95 | 75 | 5 | 60% |
| Example 3 | one-kind one-layer | 72 | A:B = 60:40 | 100 | 80 | 4 | 90% |
| Example 4 | one-kind one-layer | 32 | A:B:C = 70:20:10 | 90 | 72 | 4 | 60% |
| Example 5 | one-kind one-layer | 32 | A:B:C = 70:20:10 | 95 | 75 | 4 | 60% |
| Example 6 | three-kind five-layer | 20/3/26/3/20 (Total 72) | A:B/D/E:F:G/D/A:B = 95:5/100/43:43:14/100/95:5 | 100 | 80 | 4 | 60% |
| Example 7 | one-kind one-layer | 72 | A:B:C = 70:20:10 | 95 | 75 | 4 | 0% |
| Example 8 | one-kind one-layer | 72 | A:B:C = 70:20:10 | 95 | 75 | 4 | 0% |
| Example 9 | one-kind one-layer | 72 | A:B:C = 70:20:10 | 95 | 75 | 4 | 60% |
| Comparative Example 1 | one-kind one-layer | 160> | A:B:C = 70:20:10 | 100 | 78 | 4 | 0% |
| Comparative Example 2 | one-kind one-layer | 32 | A:B:C = 70:20:10 | 90 | 75 | 4 | 0% |
| Comparative Example 3 | one-kind one-layer | 72 | A:B = 60:40 | 100 | 70 | 4 | 0% |
| Comparative Example 4 | one-kind one-layer | 32 | A:B:C = 70:20:10 | 90 | 75 | 4 | 30% |

| | Drawing conditions to transverse (width direction) | | | | | | |
|---|---|---|---|---|---|---|---|
| | Drawing process Film temperature (° C.) | | | Heat treatment process | | | |
| | central part | end part | temperature difference (end − central) | Preset temperature (° C.) | output of the infrared heaters | Film temperature (° C.) central part | Film temperature (° C.) end part | temperature difference (end − central) |
| Example 1 | 77 | 78 | 1 | 85 | 0% | 85 | 84 | −1 |
| Example 2 | 78 | 78 | 0 | 80 | 0% | 78 | 77 | −1 |
| Example 3 | 82 | 84 | 2 | 85 | 0% | 85 | 84 | 0 |
| Example 4 | 76 | 78 | 2 | 85 | 0% | 83 | 82 | −1 |
| Example 5 | 76 | 78 | 2 | 95 | 0% | 92 | 90 | −2 |
| Example 6 | 81 | 81 | 0 | 85 | 0% | 85 | 84 | −1 |
| Example 7 | 77 | 75 | −2 | 84 | 60% | 84 | 85 | 1 |
| Example 8 | 77 | 75 | −2 | 84 | 90% | 84 | 86 | 2 |
| Example 9 | 77 | 78 | 1 | 84 | 50% | 84 | 86 | 2 |
| Comparative Example 1 | 80 | 79 | −1 | 85 | 0% | 85 | 84 | −1 |
| Comparative Example 2 | 78 | 76 | −2 | 85 | 0% | 83 | 80 | −3 |
| Comparative Example 3 | 73 | 71 | −2 | 85 | 0% | 85 | 83 | −2 |
| Comparative Example 4 | 76 | 76 | 0 | 95 | 0% | 91 | 88 | −3 |

Example 1

Polyester A, polyester B and polyester C as described above were mixed in the weight ratio of 70:20:10 and the mixed resin was introduced into an extruder. The mixed resin was molten at 280° C. and extruded from a T-die and then quenched by winding it around a rotating metal roll cooled to a surface temperature of 30° C. An undrawn film with a thickness of 72 μm was obtained. The take-off speed (rotational speed of the metal roll) of the undrawn film at this time was about 20 m/min. Tg of the undrawn film was 67° C.

Figure 1:
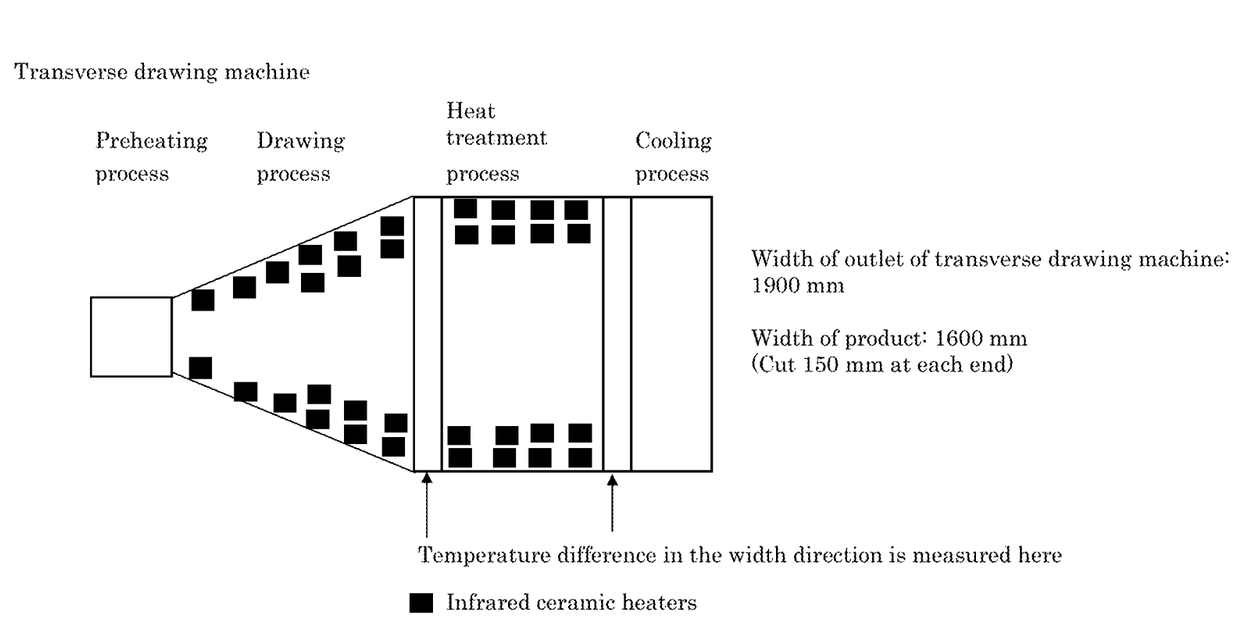
FIG. 1 shows an explanatory view of the transverse drawing machine viewed from above.

The obtained undrawn film was introduced to a tenter (transverse drawing machine). An explanatory view of the transverse drawing machine viewed from above is shown in FIG. 1. Black squares indicate infrared ceramic heaters. In the preheating process, the preset temperature was 95° C. The infrared ceramic heaters were placed as shown in FIG. 1 (note that this placement is one example of placement), and the preset temperature of a transverse drawing temperature was set to 75° C. while heating both end parts of the film by adjusting the output of the infrared ceramic heaters to 60%, and the film was drawn at a drawing ratio of 4 times. Subsequently, the heat treatment process was carried out at 85° C. for 8 seconds in a tensioned state. At this time, the infrared heaters in the heat treatment zone were not used. The evaluation results are shown in Table 3.

Afterward, the film was cooled, both edge parts thereof were cut away, and the film of 1600 mm in width was wound into a roll to continuously produce a transversely uniaxially drawn film with a thickness of 18 μm of a prescribed length. Thereafter, the resulting film was slit at the center thereof so that two films with a width of 800 mm could be taken. The film with a width of 800 mm obtained after slitting was evaluated for various properties in the above-mentioned manner. The evaluation results are shown in Table 3.

Example 2

A film with a thickness of 14.4 μm was produced in the same manner as in Example 1 except that the transverse drawing ratio was changed to 5 times, and the preset temperature of the heat treatment process was changed to 80° C. The evaluation results are shown in Table 3.

Example 3

A film with a thickness of 18 μm was produced in the same manner as in Example 1 except that polyester A and polyester B were mixed in a mass ratio of 60:40, the preset temperature of the preheating process was changed to 100° C., the preset temperature of the transverse drawing temperature was changed to 80° C., and the output of the infrared ceramic heaters was raised to 90%. Tg of the undrawn film was 75° C. The evaluation results are shown in Table 3.

Example 4

A film with a thickness of 8 μm was produced in the same manner as in Example 1 except that the speed of the cooling roll after melt-extrusion was increased to 45 m/min, the thickness of the undrawn film was changed to 32 μm, the preset temperature of the preheating process was changed to 90° C., and the preset temperature of the transverse drawing was changed to 72° C. The passing time of the heat-treatment process became short from 8 seconds to 3.6 seconds. The evaluation results are shown in Table 3.

Example 5

A film with a thickness of 8 μm was produced in the same manner as in Example 4 except that the preset temperature of the preheating process changed to 95° C., the preset temperature of the transverse drawing was changed to 75° C., and the preset temperature of the heat treatment process was changed to 95° C. The evaluation results are shown in Table 3.

Example 6

Using a co-extrusion method, a resin for forming a core layer, a resin for forming a skin layer, and a resin for forming an adhesive layer were melt-extruded from separate extruders (a first to a third extruders), stacked in a die (T-die), and quenched by winding the stacked resins around a rotating metal roll cooled to 30° C. by an air knife method to obtain an undrawn film (a polystyrene resin laminate sheet) with a thickness of 72 μm and having a three-kind five-layer structure, that is, a structure in which an intermediate layer (adhesive layer) was laminated on each of the front and back surfaces of a core layer, and a skin layer was laminated on the outside of each of those intermediate layers. The method for forming the layers of the undrawn film (including processes up to melt-extrusion) is as follows. In the following description, these layers are referred to as a first layer, a second layer, a third layer, a fourth layer, and a fifth layer in sequential order from the front side of the polystyrene-based mixed resin laminate sheet (that is, the surface of the fifth layer is a contact surface with the metal roll). The take-off speed (rotational speed of the metal roll) of the undrawn film at this time was about 20 m/min.

Formation of the First and Fifth Layers (Skin Layers)

After pre-drying the above-mentioned chip A and chip B separately using a blender apparatus, 95 parts by mass of the pre-dried chip A and 5 parts by mass of the pre-dried chip B were mixed in a blender, and then the mixture was continuously supplied to a hopper right above the first extruder with a metering screw feeder. Then, the supplied mixture of the chips A and B was melt-extruded from a T-die of the first extruder of a single screw type at 280° C. (so as to be laminated on the outside of the intermediate layers laminated on the outside of the front and back surfaces of the core layer). In order to stabilize the extrusion from the T-die, a helical and parallel-type gear pump was interposed between the extruder and the T-die.

Formation of the Second and Forth Layers (Adhesive Layers)

After pre-drying the above-mentioned chip D using a blender apparatus, the pre-dried chip D was continuously supplied to a hopper right above the second extruder with a metering screw feeder. Then, the chip D supplied was melt-extruded from a T-die of the second extruder of a single screw type (so as to be laminated on the outside of the front and back surfaces of the core layer). Note that the temperature of the second extruder was adjusted to 200° C. As in the case of the extrusion by means of the first extruder, in order to stabilize the extrusion from the T-die, a helical and parallel-type gear pump was interposed between the extruder and the T-die.

Formation of the Third Layer (Core Layer)

After pre-drying the above-mentioned chips E, F and G separately using a blender apparatus, the chips E, F and G were separately and continuously supplied to a mixer with a metering screw feeder. The supply of the chip E was adjusted to 43 parts by mass, the supply of the chip F was adjusted to 43 parts by mass, and the supply of the chip G was adjusted to 14 parts by mass. Thereafter, the mixture raw material of the chips E, F and G mixed in the mixer was separately and continuously supplied to a hopper right above the third extruder with a metering screw feeder. Then, the chips E, F and G supplied (that had been already mixed) were melt-extruded from a T-die of the third extruder of a single screw type. Note that the temperature of the third extruder was also adjusted to 200° C. As in the cases of the extrusion by means of the first extruder and the extrusion by means of the second extruder, in order to stabilize the extrusion from the T-die, a helical and parallel-type gear pump was interposed between the extruder and the T-die.

In the extrusions of the resins by means of the above-mentioned extruders, the amounts of resins discharged from the first to third extruders in the formation of the undrawn film were adjusted such that the thickness ratio of the first layer/the second layer/the third layer/the fourth layer/the fifth layer was to be 20/3/26/3/20.

Using the undrawn film thus obtained, a film with a thickness of 18 μm was produced in the same manner as in Example 1 except that the preset temperature of the pre-heating process was changes to 100° C., and the preset temperature of the drawing process was changes to 80° C. The evaluation results are shown in Table 3.

Example 7

A film with a thickness of 18 μm was produced in the same manner as in Example 1 except that the output of the infrared heaters in the transverse drawing process was changed to 0%, the set temperature in the heat treatment process was changed to 84° C., and the out put of the infrared heaters in the heat treatment process was changed to 60%. The evaluation results are shown in Table 3.

Example 8

A film with a thickness of 18 μm was produced in the same manner as in Example 7 except that the output of the infrared heaters in the heat treatment process was changed to 90%. The evaluation results are shown in Table 8.

Example 9

A film with a thickness of 18 μm was produced in the same manner as in Example 1 except that the set temperature in the heat treatment process was changed to 84° C., and the output of the infrared heaters in the heat treatment process was changed to 50%. The evaluation results are shown in Table 3.

Comparative Example 1

A film with a thickness of 40 μm was produced in the same manner as in Example 1 except that the speed of the cooling roll after melt-extrusion was decreased to 9 m/min, the thickness of the undrawn film was changed to 160 μm, preheating was performed at 100° C., transverse drawing was performed at 78° C., and the output of the infrared ceramic heaters was changed to 0%. The passing time of the heat treatment process was increased from 8 seconds to 17.8 seconds. The evaluation results are shown in Table 3.

Comparative Example 2

A film with a thickness of 8 μm was produced in the same manner as in Example 1 except that the speed of the cooling roll after melt-extrusion was increased to 45 m/min, the thickness of the undrawn film was changed to 32 μm, preheating was performed at 90° C., and the output of the infrared ceramic heaters was changed to 0%. The passing time of the heat treatment process was decreased from 8 seconds to 3.6 seconds. The evaluation results are shown in Table 3.

Comparative Example 3

A film with a thickness of 18 μm was produced in the same manner as in Example 3 except that transverse drawing was performed at 70° C., and the output of the infrared ceramic heaters was changed to 0%. The evaluation results are shown in Table 3.

Comparative Example 4

A film with a thickness of 8 μm was produced in the same manner as in Comparative Example 2 except that the output of the infrared ceramic heaters in the transverse drawing process was changed to 30%, and the set temperature in the heat treatment process was changed to 95° C. The evaluation results are shown in Table 3.

TABLE 3

| | | Film property evaluation result | | | | | | |
| --- | --- | --- | --- | --- | --- | --- | --- | --- |
| | | hot-water shrinkage at 90° C. (%) | | | | | | maximum value of the molecular orientation angle in the |
| | | width direction | | | longitudinal direction | | | width |
| | thickness (μm) | maximum value | minimum value | difference | maximum value | minimum value | difference | direction (degree) |
| Example 1 | 18 | 67 | 66 | 1 | 1 | 1 | 0 | 3 |
| Example 2 | 14.4 | 77 | 76 | 1 | 4 | 4 | 0 | 4 |
| Example 3 | 18 | 59 | 59 | 0 | 4 | 4 | 0 | 2 |
| Example 4 | 8 | 71 | 69 | 2 | 2 | 2 | 0 | 5 |
| Example 5 | 8 | 52 | 50 | 2 | 0 | 0 | 0 | 5 |
| Example 6 | 18 | 65 | 65 | 0 | 0 | 0 | 0 | 3 |
| Example 7 | 18 | 68 | 67 | 1 | 1 | 1 | 0 | 3 |
| Example 8 | 18 | 67 | 67 | 0 | 1 | 1 | 0 | 2 |
| Example 9 | 18 | 66 | 66 | 0 | 1 | 1 | 0 | 1 |
| Comparative Example 1 | 40 | 67 | 65 | 2 | 2 | 2 | 0 | 5 |
| Comparative Example 2 | 8 | 72 | 68 | 4 | 2 | 2 | 0 | 8 |
| Comparative Example 3 | 18 | 63 | 60 | 3 | 5 | 5 | 0 | 8 |
| Comparative Example 4 | 8 | 52 | 48 | 4 | 0 | 0 | 0 | 9 |

TABLE 3-continued

| | Film property evaluation result | | | | | | |
|---|---|---|---|---|---|---|---|
| | maximum shrinkage stress in the width direction (MPa) | | | absorbancy ratio in the width direction | | | irregularity of thickness in the width direction (%) |
| | maximum value | minimum value | difference | maximum value | minimum value | difference | |
| Example 1 | 6.5 | 6.4 | 0.1 | 0.78 | 0.76 | 0.02 | 3 |
| Example 2 | 9.5 | 9.4 | 0.1 | 0.89 | 0.87 | 0.02 | 2 |
| Example 3 | 9.8 | 9.8 | 0.0 | 0.91 | 0.90 | 0.01 | 3 |
| Example 4 | 7.0 | 6.8 | 0.2 | 0.82 | 0.78 | 0.04 | 2 |
| Example 5 | 5.0 | 4.9 | 0.1 | 0.85 | 0.81 | 0.04 | 4 |
| Example 6 | 4.5 | 4.4 | 0.1 | 0.70 | 0.69 | 0.01 | 4 |
| Example 7 | 6.8 | 6.7 | 0.1 | 0.79 | 0.77 | 0.02 | 3 |
| Example 8 | 6.7 | 6.6 | 0.1 | 0.78 | 0.77 | 0.01 | 3 |
| Example 9 | 6.4 | 6.4 | 0.0 | 0.75 | 0.75 | 0.00 | 4 |
| Comparative Example 1 | 6.7 | 6.5 | 0.2 | 0.79 | 0.75 | 0.04 | 3 |
| Comparative Example 2 | 7.2 | 6.9 | 0.3 | 0.83 | 0.77 | 0.06 | 3 |
| Comparative Example 3 | 10.0 | 9.8 | 0.2 | 0.93 | 0.87 | 0.06 | 3 |
| Comparative Example 4 | 5.1 | 4.8 | 0.3 | 0.86 | 0.80 | 0.06 | 4 |

INDUSTRIAL APPLICABILITY

The heat-shrinkable polyester film of the present invention has a small variation in heat shrinkage behavior in the width direction while being a thin film. Therefore, when the heat-shrinkable polyester film of the present invention is used in applications such as labels for bottles and the like which are industrially continuously processed, most of the labels may have a good appearance irrespective of which position of the film is used.

The invention claimed is:

1. A heat-shrinkable polyester film which has a main shrinkage direction in a width direction of the film and satisfies following requirements (1) to (5):
   (1) the film has a thickness of 6 μm or more and 27 μm or less;
   (2) when a width of 800 mm in the film of 800 mm or more in width is divided into eight to obtain samples, and a molecular orientation angle of the film is determined for each of the samples, a maximum value of the molecular orientation angle is 5 degrees or less;
   (3) when a width of 800 mm in the film of 800 mm or more in width is divided into eight to obtain samples, a hot-water shrinkage at 90° C. in the width direction of the film determined for each of the samples is 40% or more and 85% or less;
   (4) when a width of 800 mm in the film of 800 mm or more in width is divided into eight to obtain samples, a hot-water shrinkage at 90° C. in the width direction of the film is determined for each of the samples, a difference between a maximum value and a minimum value of the hot-water shrinkage at 90° C. in the width direction of the film is 2% or less; and
   (5) when a width of 800 mm in the film of 800 mm or more in width is divided into four to obtain samples, and a maximum shrinkage stress at 90° C. in the width direction of the film is determined for each of the samples, a difference between a maximum value and a minimum value of the maximum shrinkage stress at 90° C. in the width direction of the film is less than 0.3 MPa.

2. A package formed by covering at least a part of an outer periphery of an object to be packaged with a label obtained from the heat-shrinkable polyester film according to claim 1 and then shrinking the label on the covered object by heat.

3. The heat-shrinkable polyester film according to claim 1, wherein when an absorbency ratio is measured at 17 spots with a pitch of 50 mm in the width direction of 800 mm in the film of 800 mm or more in width, a difference between a maximum value and a minimum value of an absorbency ratio of an absorbency at 1340 $cm^{-1}$ to an absorbency at 1410 $cm^{-1}$ (1340 $cm^{-1}$/1410 $cm^{-1}$) determined for the 17 spots by polarized ATR method is 0.05 or less.

4. The heat-shrinkable polyester film according to claim 3, wherein when a thickness is measured across a width of 800 mm in the film of 800 mm or more in width, and an average value of the thickness is taken as Tave, a maximum value of the thickness is taken as Tmax, and a minimum value of the thickness is taken as Tmin, an irregularity of thickness in the width direction expressed by a following equation is 1% or more and 13% or less:

Irregularity of thickness (%)={($T$max−$T$min)/$T$ave}× 100.

5. A package formed by covering at least a part of an outer periphery of an object to be packaged with a label obtained from the heat-shrinkable polyester film according to claim 4 and then shrinking the label on the covered object by heat.

6. A package formed by covering at least a part of an outer periphery of an object to be packaged with a label obtained from the heat-shrinkable polyester film according to claim 3 and then shrinking the label on the covered object by heat.

7. The heat-shrinkable polyester film according to claim 1, wherein when a thickness is measured across a width of 800 mm in the film of 800 mm or more in width, and an average value of the thickness is taken as Tave, a maximum value of the thickness is taken as Tmax, and a minimum value of the thickness is taken as Tmin, an irregularity of thickness in the width direction expressed by a following equation is 1% or more and 13% or less:

Irregularity of thickness (%)={($T$max−$T$min)/$T$ave}× 100.

8. A package formed by covering at least a part of an outer periphery of an object to be packaged with a label obtained from the heat-shrinkable polyester film according to claim 7 and then shrinking the label on the covered object by heat.

* * * * *